United States Patent [19]

Yogo

[11] Patent Number: 4,778,274

[45] Date of Patent: Oct. 18, 1988

[54] NONCONTACT MEASURING DEVICE FOR CYLINDRICAL, ELONGATED OBJECTS BENT INTO THREE-DIMENSIONAL SHAPES

[75] Inventor: Teruaki Yogo, Setoshi, Japan

[73] Assignee: Chuo Electric Manufacturing Co., Ltd., Setoshi, Japan

[21] Appl. No.: 930,749

[22] Filed: Nov. 13, 1986

[30] Foreign Application Priority Data

Dec. 10, 1985 [JP] Japan .................................. 60-278750
Sep. 20, 1986 [JP] Japan .................................. 61-22310

[51] Int. Cl.⁴ ............................................. G01B 11/24
[52] U.S. Cl. ...................................... 356/376; 356/394
[58] Field of Search ............... 356/376, 386, 387, 394, 356/398; 250/560

[56] References Cited

U.S. PATENT DOCUMENTS 3,944,798  3/1976  Eaton ................................. 235/151.3

FOREIGN PATENT DOCUMENTS 3147772  6/1983  Fed. Rep. of Germany ...... 356/376
0188507  10/1984  Japan .................................... 356/376
0190607  10/1984  Japan .................................... 356/376

*Primary Examiner*—Gene Wan
*Attorney, Agent, or Firm*—Lahive & Cockfield

[57] ABSTRACT

A noncontact measuring device has a generally L-shaped pivotable and rotatable probe means to be disposed along a straight portion of an object. Another noncontact measuring device has a rotatable probe means with an inverted L-shape to be disposed along a straight portion of an object. The probe of the former device projects a beam of light, while that of the latter device projects two beams of light. For either measuring device, when the beam or beams of light are being intercepted by the object, coordinates of a predetermined point of the probe means are read by a three-dimensional shape measuring apparatus to which the device is connected.

17 Claims, 15 Drawing Sheets (A)
(B)

NONCONTACT MEASURING DEVICE FOR CYLINDRICAL, ELONGATED OBJECTS BENT INTO THREE-DIMENSIONAL SHAPES

FIELD OF THE INVENTION

This invention relates to devices for determining the three-dimensional shapes of cylindrical, elongated objects, such as pipes and solid cylinders, bent into such shapes, without making any mechanical contact therewith, but with a high degree of accuracy.

BACKGROUND OF THE INVENTION

So far it has been very difficult to determine, with a high degree of accuracy, the three-dimensional shape of a cylindrical, elongated product bent into such a shape and therefore having different straight portions, i.e., an object having portions whose axes cannot be directly determined, because there are many problems with the conventional three-dimensional shape measuring apparatus, i.e., those with measuring devices to brought into contact with the objects. One of the conventional apparatus is disclosed in U.S. Pat. No. 3,944,798 entitled "Method and Apparatus for Measuring Directions". This apparatus determines the three-dimensional shape of the object by finding the vectors of the straight portions of the object. The major problems with the conventional apparatus, including that of the foregoing U.S. patent, are as follows:

1. The measuring device of the conventional apparatus is relatively large in size. Therefore, it cannot be used for measurement of a short straight portion of the object.
2. A measuring device reduced in size may result in a greater measurement error.
3. When a measuring device having a circular end to be brought into contact with the object is used, the operation of the measuring apparatus takes much time and trouble.
4. Contact of the measuring device with the object may cause the object to be moved or deformed during measurement.

SUMMARY OF THE INVENTION

The primary object of the invention is to provide devices for measuring the three-dimensional shapes of cylindrical, elongated objects bent into such shapes and therefore having different straight portions, without making any mechanical contact with the objects, but with a high degree of accuracy.

Other objects of the invention will become apparent upon consideration of a detailed description of the invention which will follow.

BRIEF DESCRIPTION OF THE DRAWINGS

FIG. 6 is connected.

DETAILED DESCRIPTION OF THE PREFERRED EMBODIMENTS

Noncontact measuring devices according to two different embodiments of the invention will now be described with reference to the drawings.

First Embodiment

With reference to FIGS. 1 to 5, a noncontact measuring device according to one preferred embodiment of the invention will now be described.

Figure 1:
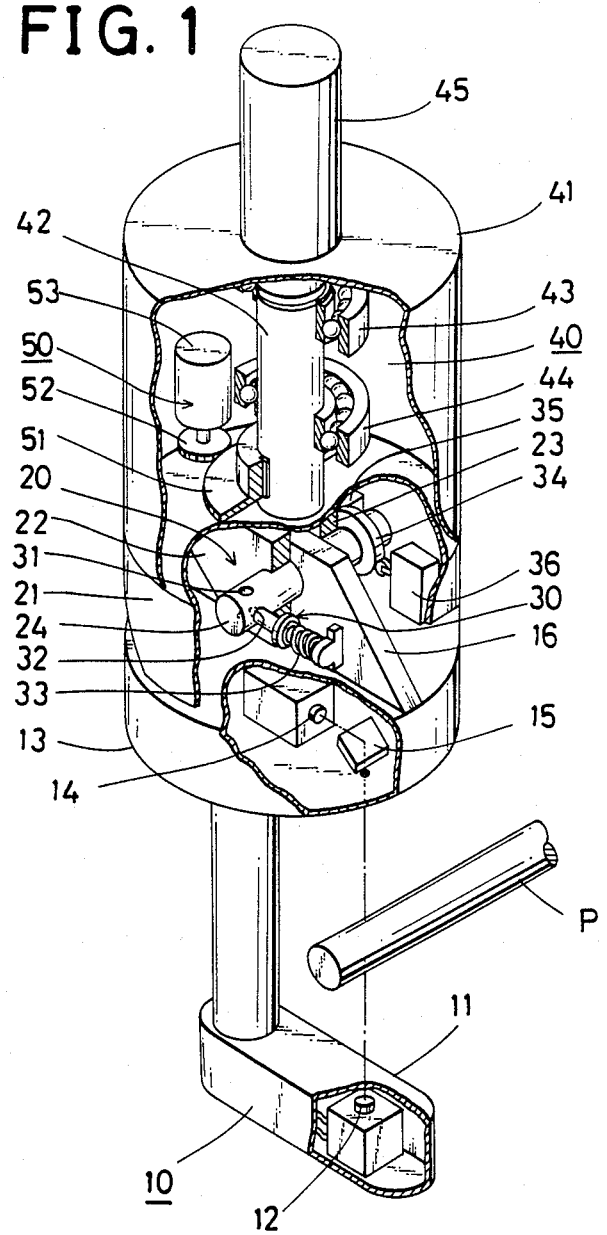
FIG. 1 is a perspective view of a noncontact measuring device according to one preferred embodiment of the invention.

Referring to FIG. 1, a noncontact measuring device according to one preferred embodiment of the invention includes a means 10 comprising (a) an upright section, (b) a horizontal section 11 connected to the lower end of the upright section at right angles therewith so as to make an "L" shape, and (c) a circular element 13 supporting the upright section. The horizontal section 11 includes therein a phototransistor 12 at its side opposite to its side of connection to the upright section. Inside the circular support 13 is provided a light projector, or light emitting diode 14 substantially located at the center of the support 13 and in parallel with the horizontal section 11. Also inside the circular support 13 is provided a mirror 15 which is located in front of the light emitting diode 14 so as to receive a beam of light projected from the light emitting diode 14 and is inclined in such a manner that the light received thereby is so reflected thereby as to come into the phototransistor 12.

From the upper surface of the circular support 10 of the probe means 10 projects upward a trapezoidal element 16 which is (pivotably) held by and between a pair of holders 22 and 23 projecting inward from a rotatable cylindrical wall 21 concentric with the circular support 13 of the probe means 10, up to the center of the upper surface of the circular support 10, but spaced apart by a certain distance from the upper surface thereof. A circular opening is made through the central portion of the trapezoidal projection 16, while the holders 22 and 23 each are provided with a semicircular opening which is aligned with the circular opening of the trapezoidal projection 16. A horizontal pivot 24 extends through all these openings of the holders 22 and 23 and of the trapezoidal projection 16. The horizontal pivot 24 is not connected to or supported by anything at its both ends, but is fixedly supported by the holders 22 and 23 at its middle portion. The trapezoidal projection 16 is pivotable about the pivot 24, so that the probe means 10 is also pivotable.

The pivot 24 is provided with a pair of recesses 31 and 32 at one free end portion thereof, which recesses 31 and 32 are so located as to make a right angle with each other with reference to the axis of the pivot 24. The trapezoidal projection 16 is provided with a pin 33 at at the side face thereof which is on the same side as the portion of the pivot 24 projecting from the trapezoidal projection 16 and having the recesses 31 and 32. The pin 33 is disposed in parallel with the trapezoidal projection 16 and is axially urged toward the pivot 24 by a coil spring, so that the pin 33 is adapted to engage with the recess 31 or 32. When the pin 33 is engaged with the recess 32, the probe means 10 is fixed in a vertical position (FIG. 1). Then, when the probe means 10 is pivoted counterclockwise (in FIG. 1), the pin 33 is engaged with the recess 31 so that the probe means 10 is fixed in a horizontal position. Thus, the probe means 10 is allowed to pivot by 90 degrees.

The pin 33, the coil spring urging the pin 33, and the recesses 31 and 32 together constitute a means for temporarily fixing the probe means 10 (in a vertical or horizontal position) which is designated by numeral 30. Also, the pivot 24 and the holders 22 and 23 together constitute a means for pivotably supporting the probe means 10 which is designated by numeral 20. This pivotal support means 20 is defined by the previously-mentioned rotatable cylindrical wall 21. The cylindrical wall 21 is disposed above the circumference of the upper surface of the circular support 13 with only a slight space from that surface.

The pivot 24 is provided with a cam 34 on the circumference of the end portion thereof which is opposite to its end portion having the recesses 31 and 32. Switches 35 and 36 are provided along the circumference of the cam 34. The switch 35 is operated by the cam 34 when the probe means 10 (to be more precise, its vertical section) is disposed in a vertical position, while the other switch 36 is operated by the cam 34 when the probe means 10 is disposed in a horizontal position. Therefore, the two switches 35 and 36 will be hereinafter referred to as a "verticality-detecting switch" and as a "horizontality-detecting switch", respectively.

Numeral 40 designates a means for rotating the pivotal support means 20 and the probe means 10 as one body. This rotation means 40 is defined by a cylindrical case 41 which is concentric with, and disposed on, the cylindrical wall 21 of the pivotal support means 20. The rotation means 40 includes a vertical rotatable shaft 42. The pivotal support means 20 is connected to the rotatable shaft 42.

In the cylindrical case 41, the rotatable shaft 42 is supported by a pair of upper and lower bearings 43 and 44. Below the lower bearing bearing 44, a large-sized gear 51 is connected to the rotatable shaft 42 at the circumference thereof. The large-sized gear 51 is engaged with a small-sized gear 52 rotatably connected to an encoder 53. Thus the angle of rotation of the probe means 10 is detected by the encoder 53 through the rotatable shaft 42 and the two gears 51 and 52. The small-sized gear 52 and the encoder 53 constitute an angle detection means 50.

In actual use, the noncontact measuring device having the above-mentioned construction is movably connected to a usual three-dimensional shape measuring apparatus (FIG. 2) by means of a shank 45 projecting from the top of the cylindrical case 41.

Signal cables from the noncontact measuring device, connected to the three-dimensional measuring apparatus, and from a position-detecting device of the three-dimensional shape measuring apparatus are connected to a control system 60 (FIG. 2) for finding the coordinates of axes of straight portions of a material bent into a three-dimensional shape, i.e., a material whose three dimensional shape is to be measured.

Figure 2:
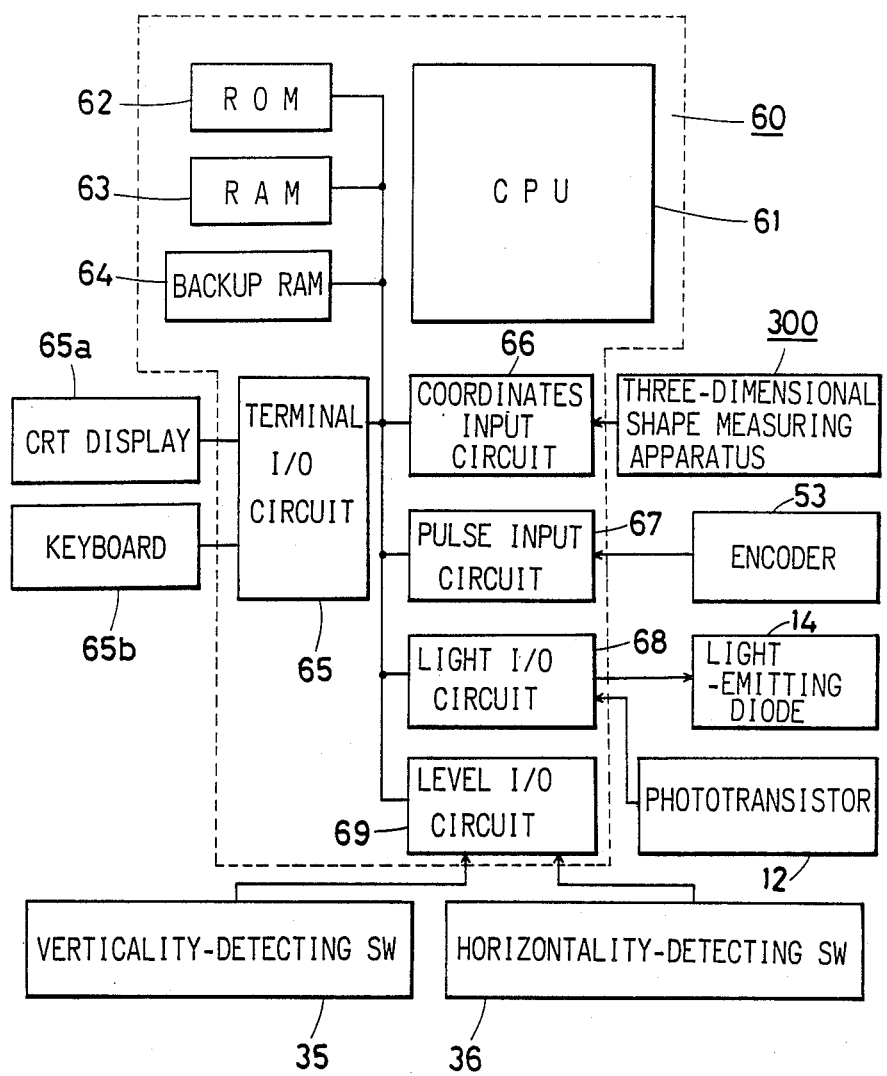
FIG. 2 shows an electrical system for the device of FIG. 1.

Referring to FIG. 2, signals of detection of position of the probe means 10 from the position-detecting device of the three-dimensional shape measuring apparatus as well as detection signals of angle of rotation of the probe means 10 from the encoder 53 are sent to a control system 60 so as to find the coordinates of axes of straight portions of a material bent into a three-dimensional shape. The control system 60 includes, as a chief component, a microcomputer comprising CPU 61, ROM 62, RAM 63, and backup RAM 64, all of which are well known in the art. The control system 60 further includes a terminal I/O circuit 65, a coordinates input circuit 66, a pulse input circuit 67, a circuit 68 for activating the light emitting diode 14, a level input circuit 69.

The terminal I/O circuit 65 is adapted to be supplied with data such as the diameter of the material (whose three-dimensional shape is to be measured) from a keyboard 65b and to cause a CRT display 65a to display data such as calculated values of coordinates.

The coordinates input circuit 66 is adapted to receive calculated three-dimensional coordinates of a predetermined point of the probe means 10 from the position-detecting device of the three-dimensional shape measuring apparatus 3. CPU 61 can detect the three-dimensional position of the probe means 10 by reading the calculated three-dimensional coordinates received in the coordinates input circuit 66.

The pulse input circuit 67 is adapted to receive pulse signals from the encoder 53, and is provided with a means for countering the pulse signals therefrom. CPU 61 can detect the angle of rotation of the probe means 10 by reading the value of the counter means of the circuit 67.

The circuit 68 is adapted to activate the light emitting diode 14 so that the latter projects a beam of light. The phototransistor 12 is increased in its level of potential when a beam of light from the light emitting diode 14 is received thereby, but is lowered in its level of potential when the light therefrom is intercepted by the material before reaching the phototransistor 12. CPU 61 monitors the potential of the phototransistor 12 through the circuit 68, so that CPU 61 can know whether a beam of light from the light emitting diode 14 has been intercepted by the material. To be more precise, upon knowing when the potential of the phototransistor 12 has been lowered, CPU 61 takes in two kinds of data, namely, the three-dimensional position of the probe means 10 and its angle of rotation, through the coordinates input circuit 66 and through the pulse input circuit 67, respectively.

The level input circuit 69 is adapted to receive ON signal from the verticality-detecting switch 35 when the probe means 10 (to be more precise, its vertical section) is in a vertical position, but receive ON signal from the horizontality-detecting switch 36 when the probe means 10 is in a horizontal position. CPU determines, through this circuit 69, whether the probe 10 is in a vertical or horizontal position.

The foregoing components of the control system 60 are connected to one another by a data bus, as shown in FIG. 2.

Figure 3:
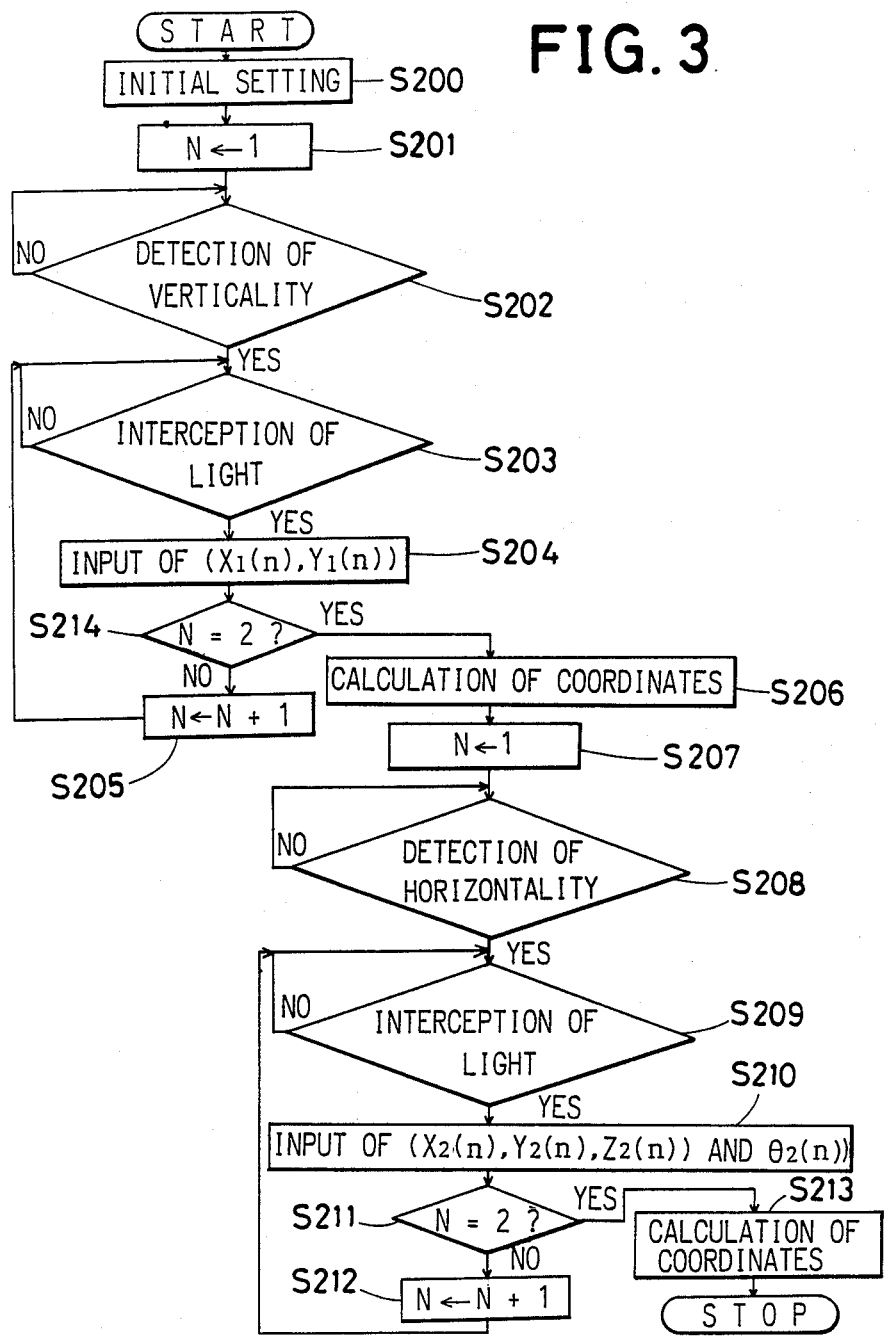
FIG. 3 is a flow chart showing the steps of measurement taken when the device of FIG. 1 is used.

Referring to FIG. 3, a description will now be given of a data processing by the control system 60 as well as the operation of the three-dimensional shape measuring apparatus of FIG. 2 and of the noncontact measuring device of FIG. 1.

A material with a three-dimensional shape and, hence, with different straight portions whose shape is to be measured is fixed to a suitable means.

A measurement subprogram illustrated in FIG. 3 is simultaneously carried out together with other subprograms such as one for causing the CRT display 65a to instantly display measurements obtained.

To begin with, both three-dimensional shape measuring apparatus 300 (to which the noncontact measuring device is movably connected) and control system 60 are energized. Upon energizing, the light emitting diode 14 of the noncontact measuring device will project a beam of light. Then, in step S200, the operator operates the keyboard 65b to enter the diameter of material P. Also, in step S200, the operator intercepts the beam of light from the diode 14 by using a reference position setting block (not shown). When the light from the diode 14 is being intercepted in this manner, CPU 61 of the control system 60 registers, as the reference position of the probe means 10, the three-dimensional coordinates of the predetermined point of the probe means 10 calculated by the three-dimensional shape measuring apparatus 3 and sent to the coordinates input circuit 66.

In the next step S201 a variable N is set at an initial value of 1.

In step S202 it is determined whether the probe means 10 (to be more precise, its vertical section) is in a vertical position. If yes, the routine goes to the next step. If no, step S202 is repeated until the probe means 10 is vertically positioned by the operator. More specifically, step S202 is repeated until the level input circuit 69 receives ON signal from the verticality-detecting switch 35. Usually, at this point of time, the probe means 10 is in a vertical position.

Figure 4:
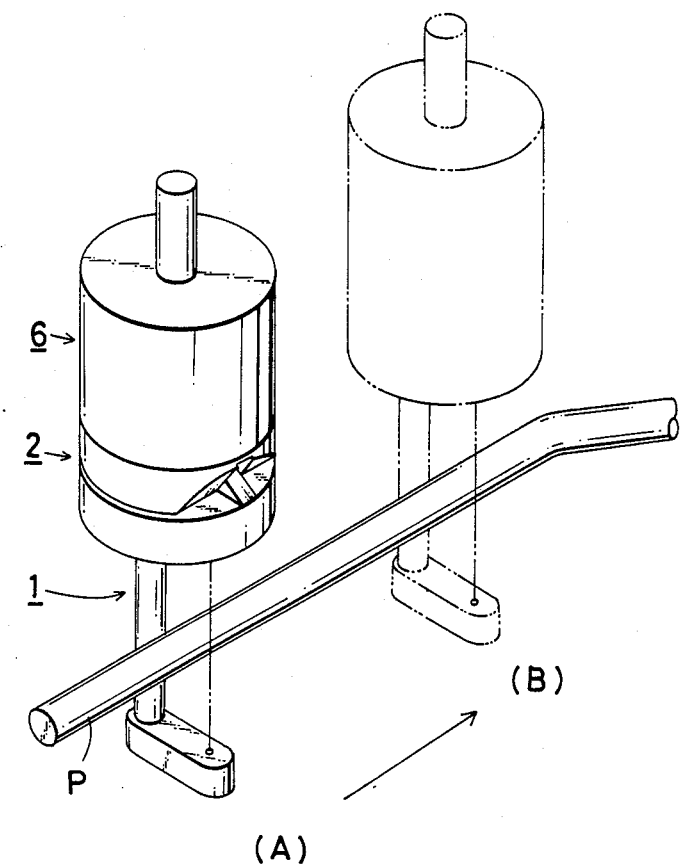
FIG. 4 shows an L-shaped probe means of the device of FIG. 1 in two different vertical measurement positions.

Then, the operator manually moves the noncontact measuring device (with its probe means 10 in a vertical position) to a certain position along a straight portion of the material P where a beam of light from the diode 14 is intercepted by the straight portion and where any portion of the noncontact measuring device is not in contact with the material P ((A) of FIG. 4).

Then, in step S203 it is determined that the light from the diode 14 has been intercepted.

In step S204, two-dimensional coordinates ($X_1(1)$, $Y_1(1)$) of the predetermined point of the probe means 10 are read while the light from the diode 14 is being intercepted by the material P.

In step S214, it is determined whether the value of variable N is two. At this point of time the value of N is still one, and then in step S205 the value of variable N is incremented by one to indicate that the reading was taken once. And the routine goes back to step S202.

The operator now moves the noncontact measuring device, while keeping the probe means 10 in its vertical position, to another position along the same straight portion of the material P where the light from the diode 14 is again intercepted by the straight portion ((B) of FIG. 4) and where any portion of the noncontact measuring device is not in contact with the material P ((B) of FIG. 4). Then, steps S203 and S204 are done again. In step S204, two-dimensional coordinates ($X_1(2)$, $Y_1(2)$) of the predetermined point of the probe means 10 are read while the light from the diode 14 of the noncontact measuring device, now in the second measurement position, is being intercepted by the straight portion of the material P. In step S214 it is determined that the value of variable N is now two, and a new step S206 is done.

Step S206 is to define the position of the axis of the straight portion of the material P relative to an X-Y plane perpendicular to the beam of light projected from the diode 14 in the two measurement positions. Calculation for this purpose is made by using the coordinates ($X_1(1)$, $Y_1(1)$) and ($X_1(2)$, $Y_1(2)$) obtained in step S214 as well as the diameter of the material P entered in step S200. Also, in step S206, there is obtained an $\alpha$-plane perpendicular to the X-Y plane and parallel to the beam of light projected from the diode 14 in the two measurement positions.

Then, the routine goes to step S207 in which the value of variable N is set at one again.

The operator now disposes the probe means 10 (to be more precise, its vertical section) in a horizontal position.

Then, in step S208, it is determined that the probe means 10 is in a horizontal position. More specifically, in this step, CPU 61 determines, through the level input circuit 69, that the horizontality-detecting switch is on.

Figure 5:
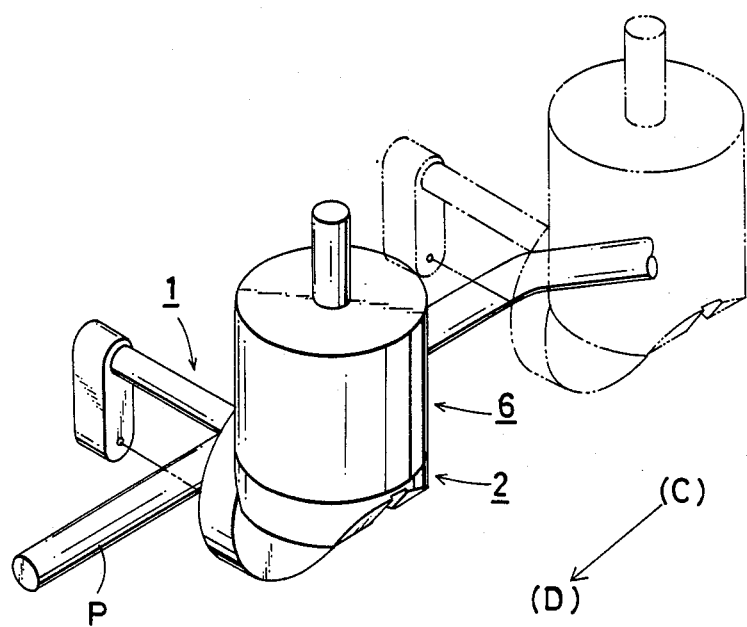
FIG. 5 shows the L-shaped probe means of the device of FIG. 1 in two different vertical measurement positions along an object bent into a three-dimensional shape.

Then, the operator manually moves the noncontact measuring device, while rotating the probe means by a certain angle if required, to a certain position along the straight portion of the material P where the light from the diode 14 is intercepted by the straight portion and where any portion of the noncontact measuring device is not in contact with the material P ((C) of FIG. 5).

In step S209, it is determined that the light from the diode 14 has been intercepted.

Then, in step S210, CPU 61 reads and takes in, through the coordinates input circuit 66, three-dimensional coordinates ($X_2(1)$, $Y_2(1)$, $Z_2(1)$) of the predetermined point of the probe means 10 while the light from the diode 14 is being intercepted by the material P, and through the pulse input circuit 67, the angle of rotation $\theta_2(1)$ of the probe means 10 which has been made after it was disposed in a horizontal position.

Then, in step S211, it is determined whether the value of variable N is two. If yes, the routine goes to step S211. If no, it goes to step S212. Since the variable N is still one at this point of time, the routine goes to step S212 where the variable N is incremented by one.

The operator manually moves the noncontact measuring device, while rotating the probe means by a certain angle if required, to another position along the straight portion of the material P where the light from the diode 14 is intercepted again by the straight portion and where any portion of the noncontact measuring device is not in contact with the material P ((D) of FIG. 5).

Step S212 is followed by step S209 which determines that the light from the diode 14 has been intercepted.

Next step S210, like the previous same step, reads three-dimensional coordinates ($X_2(2)$, $Y_2(2)$, $Z_2(2)$) of the predetermined point of the probe means 10 while the light from the diode 14 is being intercepted, as well as the angle of rotation $\theta_2(2)$ of the probe means 10 which has been made during movment from the position (C) to (D) of FIG. 5.

Then, in step S211, it is determined that the variable N is two. Then, a final step S213 is done.

The final step S213 is to define the position of the axis of the straight portion of the material P relative to the α-plane obtained in step S206. This is performed as follows: First, the position of a portion of the circumference of the straight portion relative to the α-plane is defined on the basis of the three-dimensional coordinates of the predetermined point of the probe means 10 and the angles of rotation of the probe means 10 as determined in step S210, that is, $((X_2(1), Y_2(1), Z_2(1))$ and $\theta_2(1)$ and $((X_2(2), Y_2(2), Z_2(2))$ and $\theta_2(2)$. Then, the position of the axis of the straight portion relative to the α-plane is determined from the foregoing position of the portion of the circumference of the straight portion and the diameter of the material P. The position of the axis of the straight portion thus determined is converted into usual three-dimensional coordinates.

The subprogram ends here.

If desired, the coordinates of the position of the axis of the straight portion may be obtained by any suitable method other than the one described above.

Second Embodiment

With reference to FIGS. 6 to 12, a noncontact measuring device according to another preferred embodiment of the invention will now be described.

Figure 6:
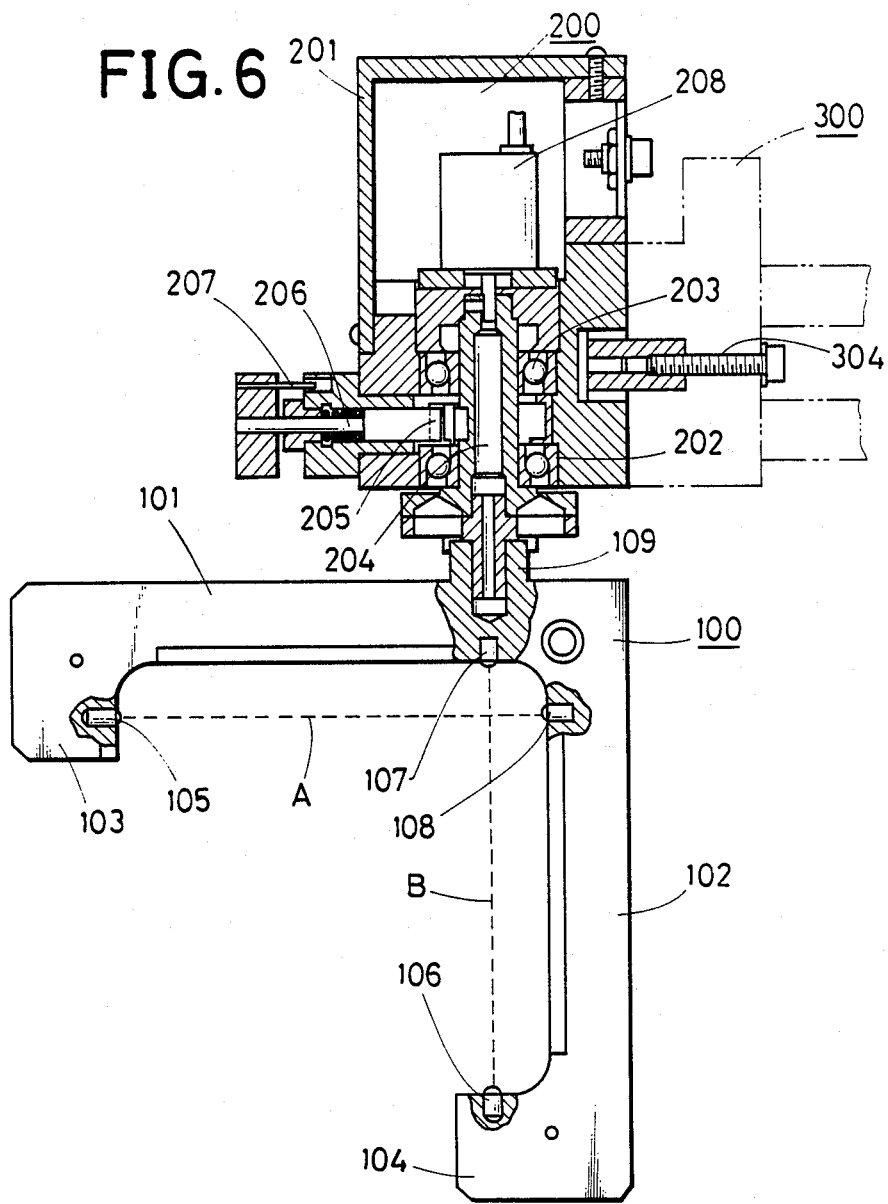
FIG. 6 shows a noncontact measuring device according to another preferred embodiment of the invention.

Referring to FIG. 6, a noncontact measuring device according to another preferred embodiment of the invention includes a probe means 100 comprising a horizontal arm 101 and a vertical arm 102 which are formed integrally with each other at a right angle. The horizontal arm 101 has a forward end with a portion 103 projecting vertically in a downward direction, while the vertical arm 102 has a lower end with a portion 104 projecting horizontally to the left (as viewed in FIG. 6). The downwardly-projecting portion 103 of the forward end of the horizontal arm 101 includes a light projector, or semiconductor laser 105 which is disposed in parallel with the horizontal portion of the horizontal arm 101 so as to project a laser beam A in parallel with the horizontal portion of the arm 101 and toward the vertical arm 102. Similarly, the horizontally-projecting portion 104 of the lower end of the vertical arm 102 includes a light projector, or semiconductor laser 106 which is disposed in parallel with the vertical portion of the vertical arm 102 so as to project a laser beam B in parallel with the vertical portion of the arm 102 and toward the horizontal arm 101. The vertical arm 102 includes a light receiving element 108 which is so disposed as to receive the laser beam A projected from the semiconductor laser 105. Similarly, the horizontal arm 101 includes a light receiving element 107 which is so disposed as to receive the laser beam B projected from the semiconductor laser 106. The laser beams A and B from the two lasers 105 and 106 intersect each other at a right angle at a point in proximity to the light receiving elements 107 and 108.

The upper surface of the horizontal arm 101 projects upward at its portion 109. Numeral 204 designates a vertical shaft 204 rotatably supported by a pair of bearings 202 and 203 in a housing 201 of a support means 200. The upwardly-projecting portion 109 of the horizontal arm 101 has an inner vertical space in alignment with the laser beam B projected from the semiconductor laser 106, into which the lower end of the vertical rotatable shaft 204 projects downward and where the lower end of the shaft is fixed to the upward projection 109. In other words, the entire probe means 100 is fixed to the rotatable shaft 204. Therefore, the probe means 100 is rotatable, together with the vertical shaft 204, about the laser beam B.

A spur gear 205 is connected to the rotatable shaft 204. Numeral 207 designates a stopper urged toward the spur gear 205 by a coil spring 206 so that the stopper 207 may engage with the gear 205. The stopper 207 is therefore adapted to temporarily fix the rotatable shaft 204 by engaging with the gear 205. More specifically, the stopper 207 is engaged with the gear 205 after the shaft 204 has been rotated by a certain required angle, so as to fix the shaft 204 in its orientation after the rotation. The angle of rotation of the shaft 204 is detected by an encoder 208 provided above the shaft 204.

Figure 7:
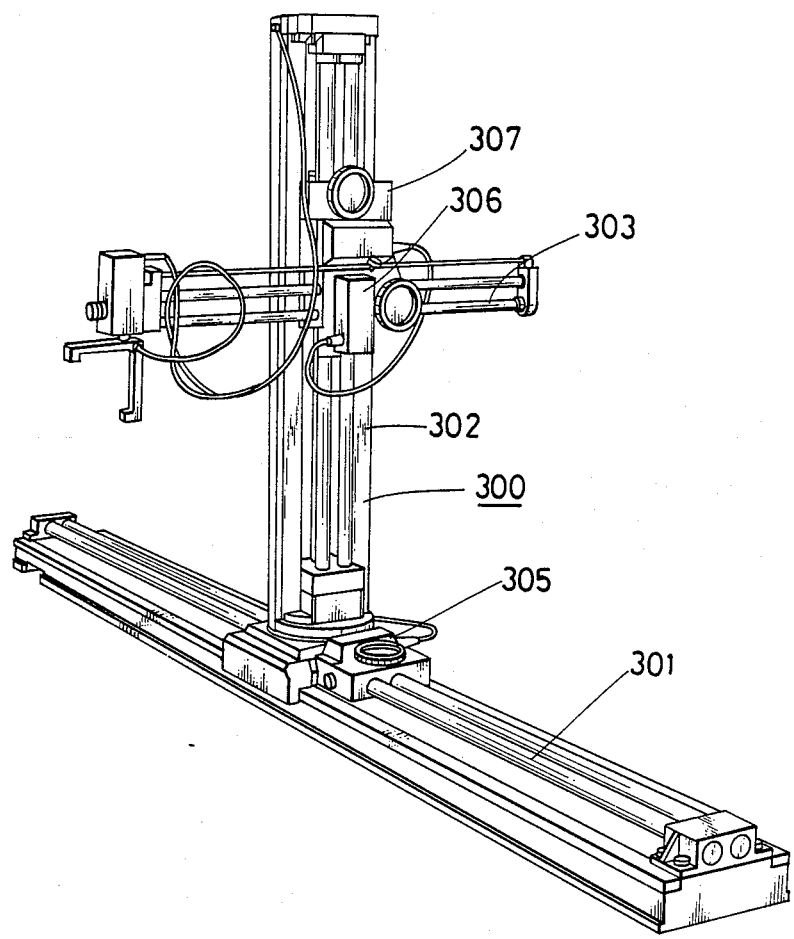
FIG. 7 is a perspective view of a three-dimensional shape measuring apparatus to which the device of FIG. 6 is connected.

In FIG. 7 the noncontact measuring apparatus having the foregoing construction is connected to a three-dimensional shape measuring apparatus 300. This apparatus 300 comprises (a) a horizontal base or guide element 301 including a pair of parallel horizontal guide bars, (b) an upright guide element 302 including a pair of parallel upright guide bars, and (c) a horizontal element 303 for supporting the noncontact measuring device at its one end, which element 303 includes a pair of parallel horizontal bars. The horizontal guide bars of the horizontal base element 301 extend through the base of the upright guide element 302, and the upright guide element 302 is so supported on the base 301 that the element 302 may be horizontally moved along the horizontal guide bars of the base 301. The horizontal support element 303 is disposed in a plane perpendicular to the base 301. The upright guide bars of the upright guide element 302 extend through the horizontal support element 303, and the horizontal support element 303 is so supported by the upright guide element 302 that the element 303 may be vertically moved along the upright guide bars of the element 302. The horizontal bars of the horizontal support element 303 may be moved relative to the rest of the element 303 in their lengthwise directions. The noncontact measuring device is connected to one end of the horizontal support element, or of the horizontal bars thereof, by means of a bolt 304 (FIG. 6).

The upright guide element 302 is provided, at its base, with a means 305 for detecting the position of the upright guide element 302 relative to the horizontal base element 301. The horizontal support element 303 is provided with a means 306 for detecting the position of the horizontal position of the support element 303 relative to the horizontal base element 301 and with a means 307 for detecting the vertical position of the support element 303 relative to the upright guide element 302.

Figure 8:
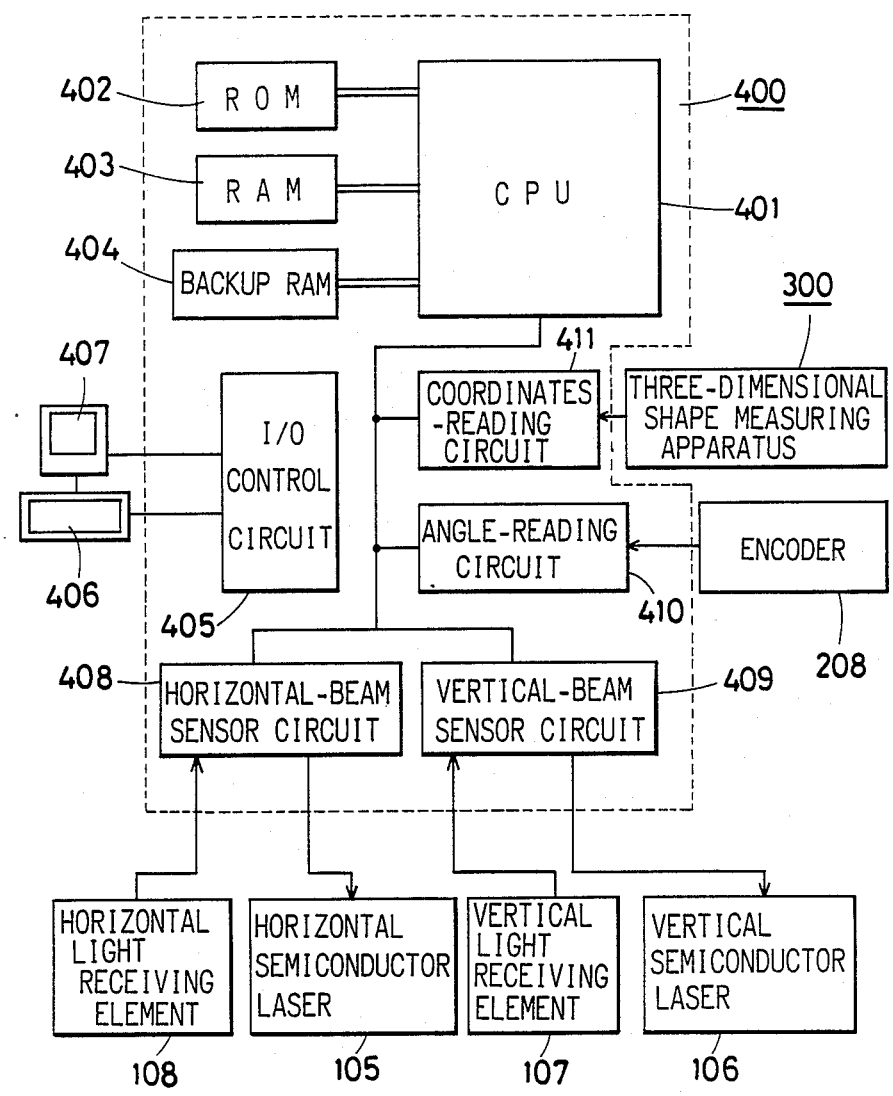
FIG. 8 shows an electrical system for the device of FIG. 6.

Referring to FIG. 8, signals from the foregoing position-detecting means 305, 306 and 307 and those from the encoder 208 of the noncontact measuring device are all sent to a control system 400 by signal lines, so as to enable the control system 400 to calculate coordinates of a material P bent into a three-dimensional shape. The control system 400 includes, as a chief component, a microcomputer comprising CPU 401, ROM 402, RAM 403, and a backup RAM 404, all of which are well known in the art. The control system further includes an I/O control circuit 405, a horizontal-beam sensor circuit 408, a vertical-beam sensor circuit 409, a coordinates-reading circuit 411, and an angle-reading circuit 410.

The I/O control circuit 405 is adapted to receive data such as the diameter of the material P entered from a keyboard 406 and to cause a CRT display 407 to display data such as calculated coordinates.

The horizontal-beam control circuit 405 is adapted to cause the horizontal semiconductor laser 105 to project a beam of light A and to receive an electric potential from the horizontal light receiving element 108. Similarly, the vertical-beam control circuit 409 is adapted to cause the vertical semiconductor laser 106 to project a beam of light B and to receive an electric potential from the vertical light receiving element 107. While the light receiving element 108 (or 107) is receiving a beam of light A (or B) from the semiconductor laser 105 (or 106), the beam sensor circuit 408 (or 409) receives a high potential from the light receiving element 108 (or 107). However, when the light from the semiconductor laser is intercepted, the beam sensor circuit receives a low potential from the light receiving element. And while the low potential is being received thereby, CPU 401 reads, through the coordinates-reading circuit 411, data from the three-dimensional shape measuring apparatus. Also, during reception of the low potential, the angle-reading circuit 410 sends CPU 401 the number of pulse signals received from the encoder 208 of the noncontact measuring device. CPU 401 is thus supplied with data as to the material P.

The foregoing different circuits of the control system 400 are connected to one another by a data bus.

Figure 9:
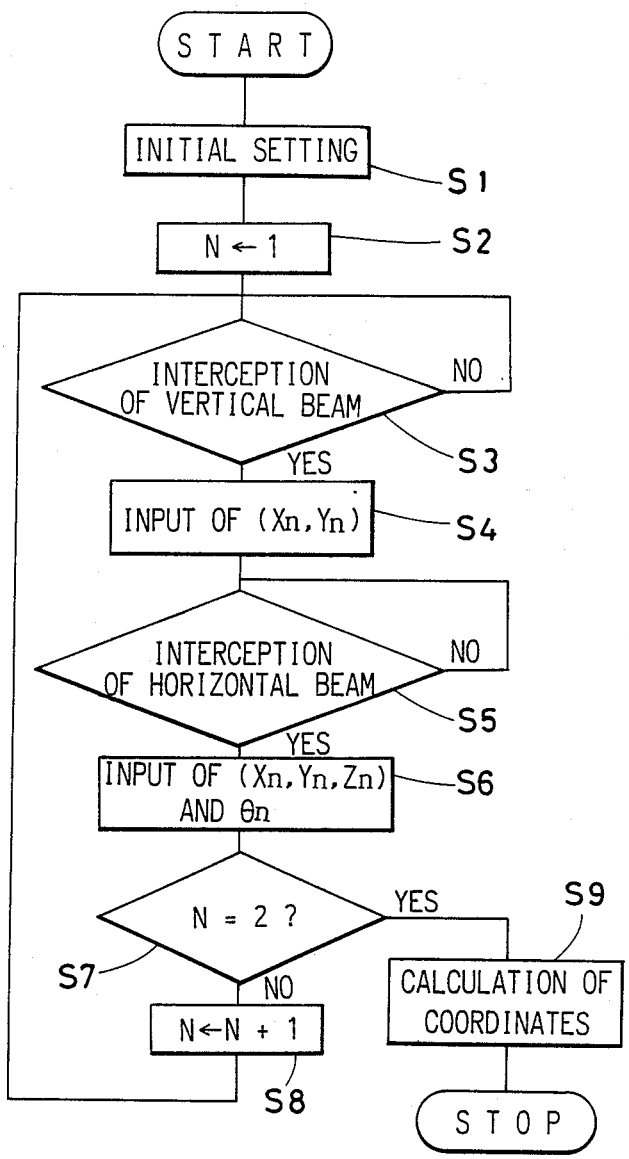
FIG. 9 is a flow chart showing the steps of measurement taken when the device of FIG. 6 is used.

Referring to FIG. 9, a description will now be given of a data processing by the control system 400 as well as the operation of the three-dimensional shape measuring apparatus of FIG. 7 and of the noncontact measuring device of FIG. 6.

A material P with a three-dimensional shape and, hence, with different straight portions whose shape is to be measured is fixed to a suitable means.

A measurement subprogram illustrated in FIG. 9 is simultaneously carried out together with other subprograms such as one for causing the CRT display 407 to instantly display measurements obtained.

To begin with, both three-dimensional shape measuring apparatus 300 (to which the noncontact measuring device is connected) and control system 400 are energized. Upon energizing, both horizontal semiconductor laser 105 and vertical semiconductor laser 106 of the noncontact measuring device will project a beam of light. Then, in step S1, the operator operates the keyboard 406 to enter the diameter of the material P. Also, in step S1, the operator intercepts the beams of light from both light projectors 105 and 106 by using a reference position setting block (not shown). When the lights from the projectors are being intercepted in this manner, CPU 401 of the control system 400 registers, as the reference position of the probe means 100, the three-dimensional coordinates of the predetermined point of the probe means 100 calculated by the three-dimensional shape measuring apparatus 300 and sent to the coordinates-reading circuit 411.

In a next step S2 a variable N is set at an initial value of 1.

Figure 10:
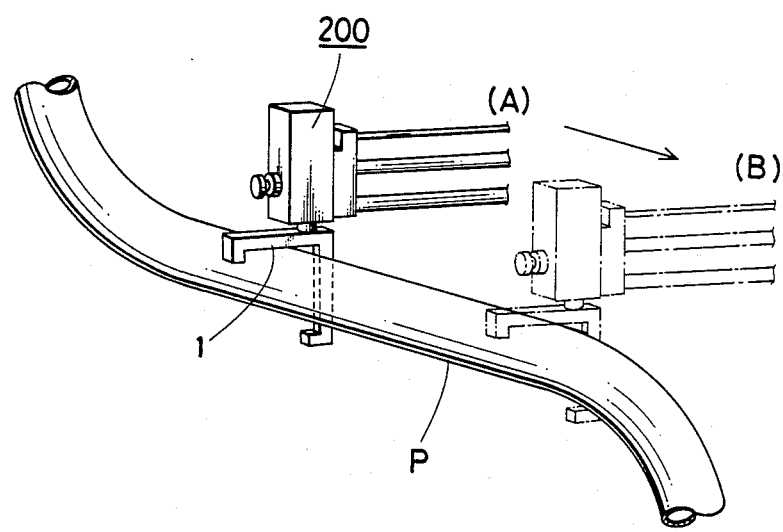
FIG. 10 shows the device of FIG. 6 in two different measurement positions along an object bent into a three-dimensional shape.

Then, the operator manually moves the noncontact measuring device to a certain position along a straight portion of the material P where the vertical beam of light B from the semiconductor laser 106 is intercepted by the straight portion and where any portion of the noncontact measuring device is not in contact with the material P ((A) of FIG. 10).

Then, in step S3 it is determined that the light B from the laser 106 has been intercepted.

In step S4, two-dimensional coordinates $(X_1, Y_1)$ of a predetermined point of the probe means 100 are read while the laser beam B is being intercepted by the straight portion of the material P.

Then, the operator manually moves the noncontact measuring device, while rotating the probe means 100 by a certain angle, to another position along the same straight portion of the material P which is spaced away from the first position by only a small distance and where the horizontal beam of light A from the laser 105 is intercepted by the straight portion of the material P and where any portion of the noncontact measuring device is not in contact with the material P.

Then, in step S5, it is determined that the horizontal light A is being intercepted.

Next step S6 is to read three-dimensional coordinates $(X_1, Y_1, Z_1)$ of the predetermined point of the probe means 100 while the horizontal light A is being intercepted, as well as the angle of rotation $\theta_1$ of the probe means 100 which has been made during movement from its first position.

Next step S7 determines that the value of variable N is one.

Then, in step S8, the value of variable N is incremented by one. And the routine goes back to step S3.

The operator now manually moves the noncontact measuring device to another position along the same straight portion of the material P where the vertcial laser beam B is intercepted again by the straight portion and where any portion of the noncontact measuring device is not in contact with the material P ((B) of FIG. 10).

Then, step S3 determines that the vertical beam B is being intercepted. Step S3 is followed by steps S4 to S6 again. That is, in step S4, two-dimensional coordinates $(X_2, Y_2)$ of the predetermined point of the probe means 100 are read while the laser beam B is being intercepted by the straight portion of the material P. Then, the operator manually moves the noncontact measuring device, while rotating the probe means 100 by a certain angle, to another position along the same straight portion of the material P which is spaced away from the first position (B) by only a small distance and where the horizontal beam A from the laser 105 is now intercepted by the straight portion of the material P and were any portion of the noncontact measuring device is not in contact with the material P. Then, step S5 determines that the horizontal beam A is being intercepted. Step S6 is to read three-dimensional coordinates $(X_2, Y_2, Z_2)$ of the predetermined point of the probe means 100 while the horizontal light A is being intercepted, as well as the angle of rotation $\theta_2$ of the probe means 100 which has been made during movement from its first position (B). Step S7 determines that the value of variable N is two.

Then, the routine goes to a final step S9 which is done as follows: First, the position of the axis of the straight portion of the material P relative to an X–Y plane perpendicular to the vertical beam B in the above-mentioned measurement positions along the straight portion is defined by using the two-dimensional coordinates $(X_1, Y_1)$ and $(X_2, Y_2)$ of the predetermined point of the probe means 100, as well as the diameter of the material P entered from the keyboard 406. Secondly, an α-plane perpendicular to the X–Y plane and containing the foregoing position of the axis of the straight portion relative to the X–Y plane is obtained. Then, the position of a portion of the circumference of the straight portion contained in the α-plane is determined by using the three-dimensional coordinates of the predetermined point of the probe means 100 and the angles of rotation of the probe means 100 as obtained in step S6, namely, $(X_1, Y_1, Z_1)$, $\theta_1$, $(X_2, Y_2, Z_2)$, and $\theta_2$. Finally, the position of the axis of the straight portion relative to the $\alpha$-plane is defined by using the foregoing position of the portion of the circumference of the straight portion and the diameter of the material P. The position of the axis of the straight portion thus determined is converted into usual three-dimensional coordinates.

The subprogram ends here.

Figure 12:
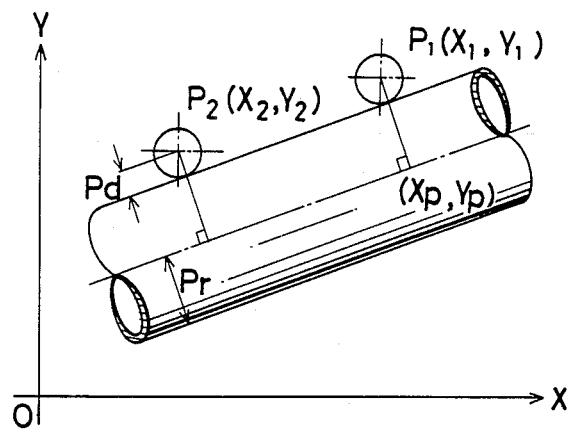
FIGS. 12(a) to 12(c) illustrate the calculation of coordinates.
Figure 12:
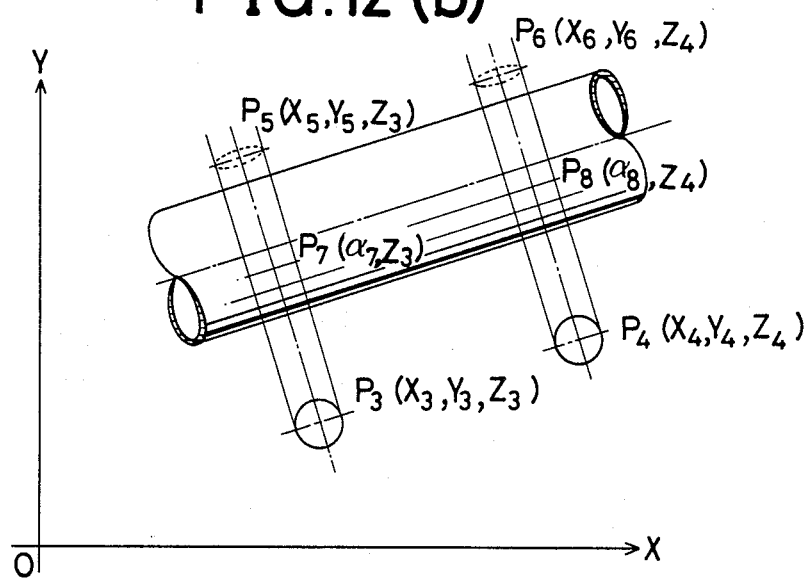
Figure 12C:
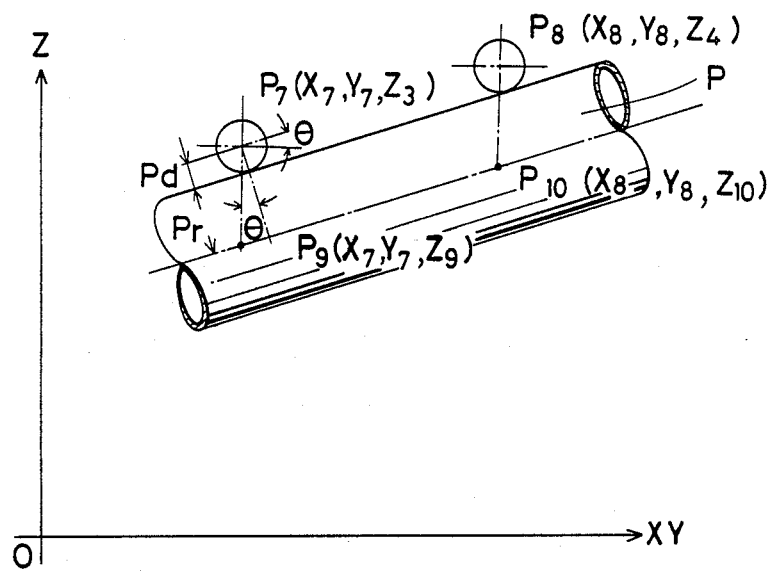

With reference to FIGS. 12(a) to 12(c), a theoretical explanation with numerical expressions will now be given of how the position of the axis of the straight portion of the material P may be defined in the foregoing step S9.

In an explanation which will follow, suppose that the laser beams A and B are cylindrical ones. However, where laser beams with a high accuracy are used, it may be considered that the radii of the laser beams are zero. Also, in the following explanation, suppose that either of the laser beams A and B is so projected as not to intersect the outer surface of a straight portion of the material, but to touch a certain point of the outer surface so that the beam makes right angles with the straight line on the outer surface containing the point of touch.

In FIG. 12(a), the vertical laser beam B is in touch with the outer surface of the straight portion in two different points, with its axis being positioned at points $P_1$ and $P_2$ in a horizontal X-Y plane. Suppose that these points $P_1$ and $P_2$ have two-dimensional coordinates $(X_1, Y_1)$ and $(X_2, Y_2)$, respectively. Needless to say, in actuality, one and the same vertical beam cannot exist in different positions at the same time; FIGS. 12(a) to 12(c) are presented only for the sake of explanation.

The axis of the straight portion is contained in the vertical plane perpendicular to the above-mentioned X-Y plane and containing the straight line in the X-Y plane which is parallel to and spaced apart from the straight line connecting the axes of the laser beam B by the radius of the beam Pd plus that of the straight portion or material Pr. This vertical plane will be hereinafter called an "$\alpha$-plane".

The above-mentioned straight line in the X-Y plane is represented by the following equation (1):

$$Y - Yp = \frac{(Y_2 - Y_1)}{(X_2 - X_1)} \cdot (X - Xp) \quad (1)$$

where:

$Yp = Y_1 + (Pr + Pd) \cdot \cos A$ $Xp = X_1 - (Pr + Pd) \cdot \sin A$ where:

$$A = \tan^{-1} \frac{(Y_2 - Y_1)}{(X_2 - X_1)}$$

In FIG. 12(b), the horizontal laser beam A is in touch with the outer surface of the straight portion in two different points in the X-Y plane. Suppose that selected points $P_5$ and $P_6$ of the axes of the horizontal beam A in these two different positions have three-dimensional coordinates $(X_5, Y_5, Z_3)$ and $(X_6, Y_6, Z_4)$. At this point of time, the vertical beam B has its axes at two different points $P_3$ and $P_4$ in the X-Y plane. Suppose that these two points $P_3$ and $P_4$ have three-dimensional coordinates $(X_3, Y_3, Z_3)$ and $(X_4, Y_4, Z_4)$, respectively.

If $B = \dfrac{(Y_5 - Y_3)}{(X_5 - X_3)}$ and $C = \dfrac{(Y_6 - Y_4)}{(X_6 - X_4)}$, then the following equations hold regarding $P_7(X_7, Y_7, Z_3)$ and $P_8(X_8, Y_8, Z_4)$:

$$X_7 = \frac{B \cdot X_3 - Y_3 + Yp - \tan A \cdot Xp}{B - \tan A}$$

$$Y_7 = \tan A \cdot (X_7 - Xp) + Yp$$

$$X_8 = \frac{C \cdot X_4 - Y_4 + Yp - \tan A \cdot Xp}{C - \tan A}$$

$$Y_8 = \tan A \cdot (X_8 - Xp) + Yp$$

In FIG. 12(c), the horizontal beam A is in touch with the outer surface of the straight portion in two different points, with its axes being positioned at points $P_7$ and $P_8$ relative to the $\alpha$-plane. Suppose that these points $P_7$ and $P_8$ have coordinates $(\alpha_7, Z_3)$ and $(\alpha_8, Z_4)$, respectively, where:

$\alpha_7 = (X_7, Y_7)$ $\alpha_8 = (X_8, Y_8)$

Suppose that, in FIG. 12(c), points $P_9$ and $P_{10}$ are those contained in the axis of the straight portion and have coordinates $(X_7, Y_7, Z_9)$ and $(X_8, Y_8, Z_{10})$, respectively. Then, the straight line connecting the foregoing points $P_7$ and $P_8$ of the axes of the horizontal beam are contained in the $\alpha$-plane and parallel to the axis of the straight portion.

$$Z_9 = Z_3 - \frac{(Pd + Pr)}{\cos \theta}$$

$$Z_{10} = Z_4 - \frac{(Pd + Pr)}{\cos \theta}$$

$$\theta = \tan^{-1} \frac{Z_4 - Z_3}{\sqrt{(X_8 - X_7)^2 + (Y_8 - Y_7)^2}}$$

Thus, the three-dimensional coordinates $(X_7, Y_7, Z_9)$ of the point $P_9$ and those $(X_8, Y_8, Z_{10})$ of the point $P_{10}$ are determined.

If the beam A and/or B touches a point of the outer surface of the straight portion so as to make any angle other than the right one with the straight line on the outer surface containing the point of touch, it is necessary accordingly to adjust the calculation of the coordinates.

The three-dimensional position of axis of the straight portion of the material is defined from the three-dimensional coordinates of the foregoing two points $P_9$ and $P_{10}$. The same measurement is made for the other straight portions of the material. Then, the coordinates of intersection point of the axes of the adjacent straight portions are determined by the conventional method, so as to exactly determine the shape of the material bent into a three-dimensional shape. Thus, it may be determined whether the bending operation has been performed as required.

If desired, in the foregoing program, the coordinates of the position of the axis of the straight portion may be obtained by any suitable method other than the one described above.

Although, in either embodiment described above, the noncontact measuring device is manually moved to measurement positions, it may be automatically moved under control of a computer. Also, it is possible automatically to measure the diameter of the material P by the measuring device itself rather than to enter it from the keyboard. Furthermore, it is possible to rotate the probe means by a suitable means such as a motor under automatic control of a computer. Also, in the second embodiment, although the laser beams A and B intersect each other at a right angle, the semiconductor lasers 105 and 106 may be so arranged that the beams therefrom make another suitable angle, or so arranged that the beams do not intersect each other at all. Moreover, the second embodiment may be so modified in its construction that the probe means 100 is rotated about a suitable axis other than the vertical laser beam B. If any of these modifications is made, however, the program may be accordingly modified.

Figure 11:
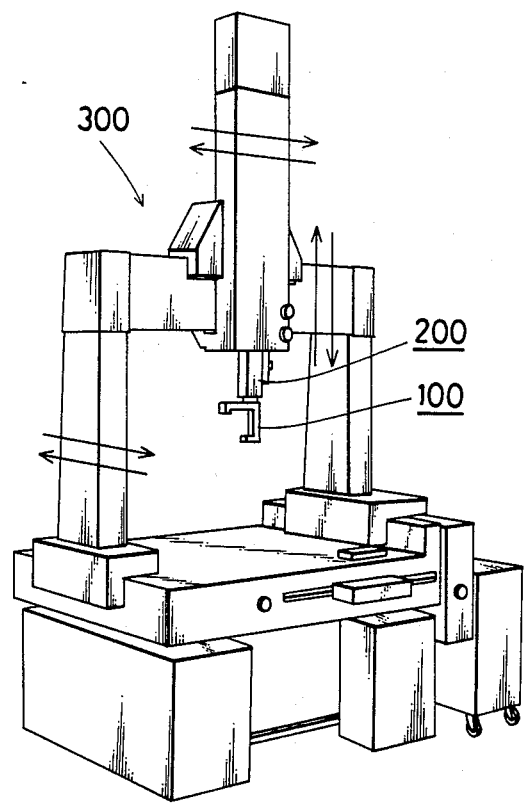
FIG. 11 is a perspective view of a bridge-type three-dimensional shape measuring apparatus to which the device of FIG. 6 is connected.
Figure 13:
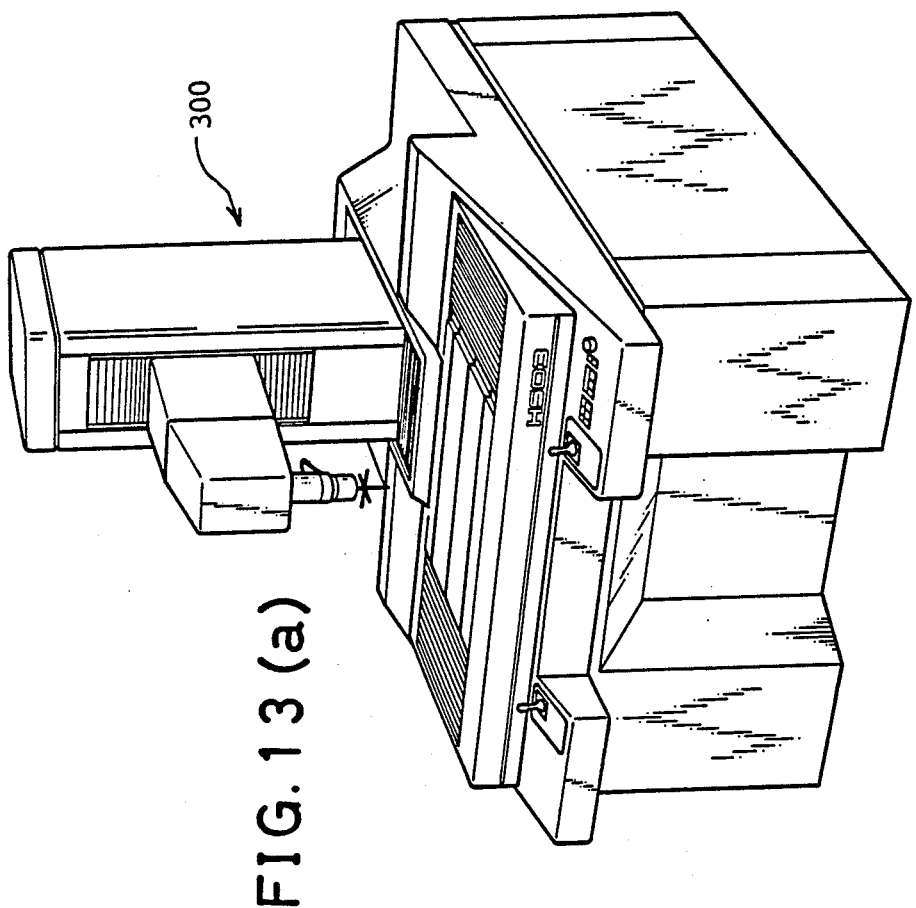
FIGS. 13A–C show a cantilever-type shape measuring apparatus to which the device of FIG. 1
Figure 13C:
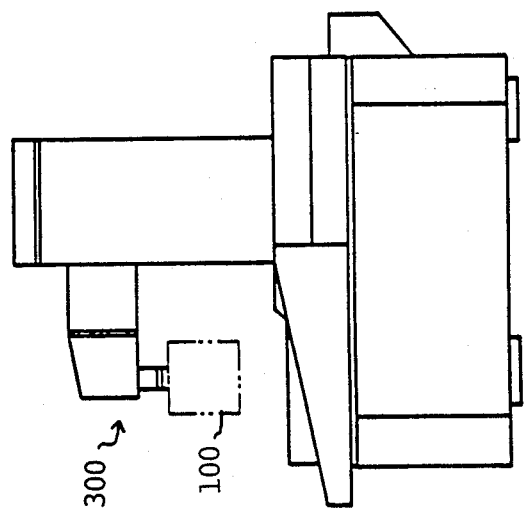
Figure 13B:
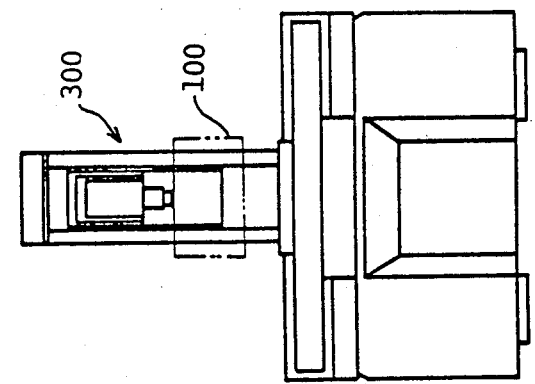

Also, the noncontact measuring device according to the second embodiment has been described as being connected to the layout-type three-dimensional shape measuring apparatus 300 so that the measuring device may be freely moved in a three-dimensional manner. However, it may be connected to a bridge-type one as illustrated in FIG. 11 or to a cantilever-type one as illustrated in FIGS. 13A-13C.

According to the invention, it is possible to measure the shapes of cylindrical, elongated objects without making any physical contact with them, and, therefore, those of electrically conductive objects can be measured with just the same safety as electrically insulated objects. Also, with the present noncontact measuring device, there is little danger that the object may be accidentally moved or deformed during measurement. Moreover, there is no need to replace the measuring device with another one in order to measure the shapes of objects with different diameters. In addition, the present noncontact measuring device does not require the long and troubling preparations for measurement as required in the prior art. Furthermore, the present measuring device may be used for cylindrical, elongated objects with widely different shapes. Measurement can be made with an extremely high accuracy which has so far been unpredictable.

What is claimed is:

1. A device for exactly determining the three-dimensional shape of cylindrical, elongated objects bent into such a shape, without making any mechanical contact therewith, which is connected, for use, to a three-dimensionally movable support arm of a three-dimensional shape measuring apparatus, including:

(a) a generally L-shaped probe means having an optical sensor which comprises a means for projecting a beam of light and a means for receiving a beam of light projected therefrom in a certain position relative to said light projecting means, said beam of light projected from said light projecting means being reflected by a suitable means within said probe means, then passing through the outer space, and entering said probe means again so as to be received by said light receiving means;

(b) a means for pivotally supporting said probe means for vertical swinging movement between a vertical position and a horizontal position;

(c) a means for temporarily fixing said probe means to said pivotal support means in at least two positions within said swinging range thereof;

(d) a means for supporting said pivotal support means for horizontal rotation, so as to horizontally rotate said probe means in one of said positions where said probe means is temporarily fixed by said fixing means; and (e) a means for detecting the angle of rotation of said pivotal support means and, hence, that of said probe means.

2. A device in accordance with claim 1 wherein said three-dimensional shape measuring apparatus is a layout-type one.

3. A device in accordance with claim 1 wherein said three-dimensional shape measuring apparatus is a bridge-type one.

4. A device in accordance with claim 1 wherein said three-dimensional shape measuring apparatus is a cantilever-type one.

5. A device in accordance with claim 1 wherein said means for projecting a light of beam is a semiconductor laser.

6. A device in accordance with claim 1 wherein said at least two positions where said probe means are fixed are such a position as to cause said beam of light projected from said light projecting means and reflected by said suitable means to pass through the outer space in a vertical direction and such a position as to cause said beam of light projected from said light projecting means and reflected by said suitable means to pass through the outer space in a horizontal direction.

7. A device in accordance with claim 6 wherein said horizontal rotation of said probe means by said means (d) is one about an axis parallel to the portion of said beam of light passing through the outer space in a vertical direction.

8. A device for exactly determining the three-dimensional shape of cylindrical, elongated objects bent into such a shape, without making any mechanical contact therewith, which is connected, for use, to a three-dimensionally movable support arm of a three-dimensional shape measuring apparatus, including:

(a) a probe means having a horizontal section projecting downward at a forward end thereof and a vertical section formed integrally with said horizontal section so as to make a right angle with said horizontal section and projecting horizontally, at the lower end thereof, towards the side of said forward end of said horizontal section, said horizontal section including (A) a means located within its downwardly-projecting portion for projecting a horizontal beam of light towards said vertical section and (B) a light receiving means located within a portion thereof in close proximity to the end portion thereof opposite to said forward end thereof and said vertical section including (C) a means located within its horizontally-projecting portion in alignment with said light receiving means (B) for projecting a vertical beam of light so that it is received by said light receiving means (B) and (D) a means located within a portion thereof in close proximity to the upper end portion thereof and in alignment with said light projecting means (A) for receiving a horizontal beam of light projected from said light projecting means (A);

(b) a means for rotatably supporting said probe means; and (c) a means for detecting the angle of rotation of said probe means.

9. A device in accordance with claim 8 wherein said three-dimensional shape measuring apparatus is a lay-out-type one.

10. A device in accordance with claim 8 wherein said three-dimensional shape measuring apparatus is a bridge-type one.

11. A device in accordance with claim 8 wherein said three-dimensional shape measuring apparatus is a cantilever-type one.

12. A device in accordance with claim 8 wherein said light projecting means (A) and (C) are both semiconductor lasers.

13. A device in accordance with claim 8 wherein said light projecting means (A) and (C) are so disposed that a horizontal beam of light projected from the former (A) intersect a vertical beam of light from the latter (C) at a right angle.

14. A device in accordance with claim 8 wherein said rotation of said probe means by said support means (b) is one about a vertical beam of light projected from said light projecting means (C).

15. A device in accordance with claim 8 wherein said rotation of said probe means by said support means (b) is one about an axis parallel to a vertical beam of light projected from said light projecting means (C).

16. A device in accordance with claim 8 wherein said rotation of said probe means by said support means (b) is one about a horizontal beam of light projected from said light projecting means (A).

17. A device in accordance with claim 8 wherein said rotation of said probe means by said support means (b) is one about an axis parallel to a horizontal beam of light projected from said light projecting means (A).

* * * * *